(No Model.) 2 Sheets—Sheet 1.

G. F. SIMONDS.
BALL BEARING.

No. 466,437. Patented Jan. 5, 1892.

Witnesses.
Robert Pruitt
Dennis Sumby

Inventor.
George F. Simonds,
By James L. Norris.
Atty.

(No Model.) 2 Sheets—Sheet 2.

G. F. SIMONDS.
BALL BEARING.

No. 466,437. Patented Jan. 5, 1892.

Witnesses.
Robt Everitt
Dennis Sumby

Inventor.
George F. Simonds.
By
James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 466,437, dated January 5, 1892.

Application filed April 23, 1891. Serial No. 390,155. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to that class of ball-bearings in which a number of spherical rollers or balls are arranged between concentric bearing-surfaces for the purpose of sustaining radial pressure or weight, and comprising also other spherical rollers or balls arranged between plane bearing-surfaces to resist thrust or end pressure.

The invention consists in the novel construction, arrangement, and combination of parts in a ball-bearing adapted more particularly for application to the hubs and axles of vehicles, as hereinafter shown and described, though also capable of use in other situations.

Figure 1:
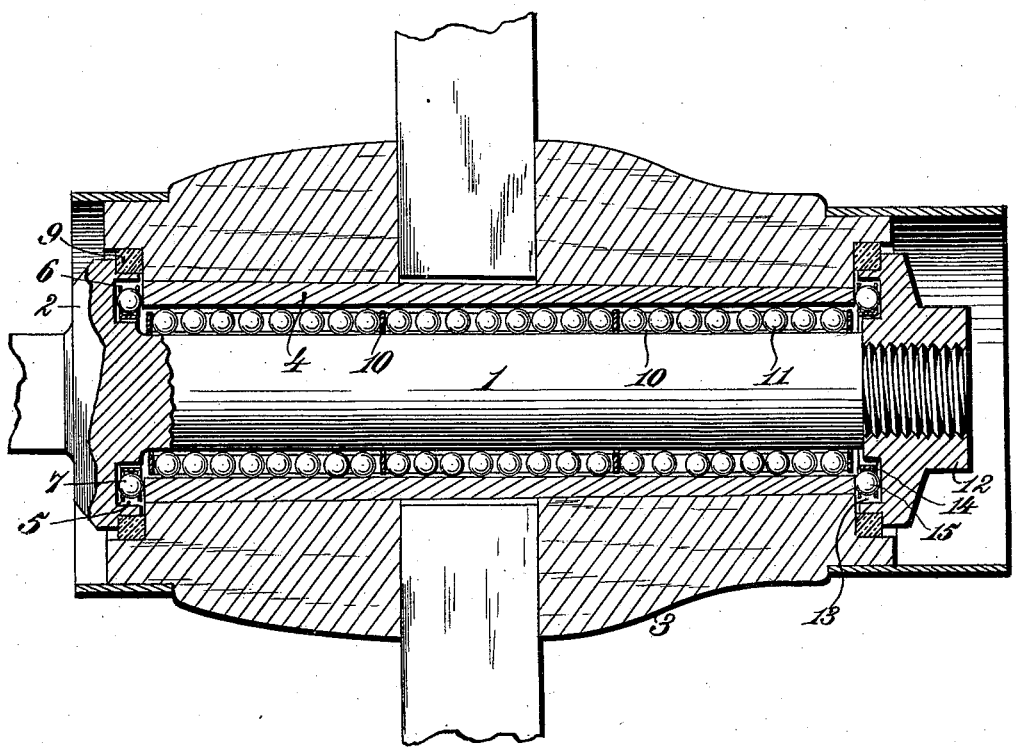
Figure 2:
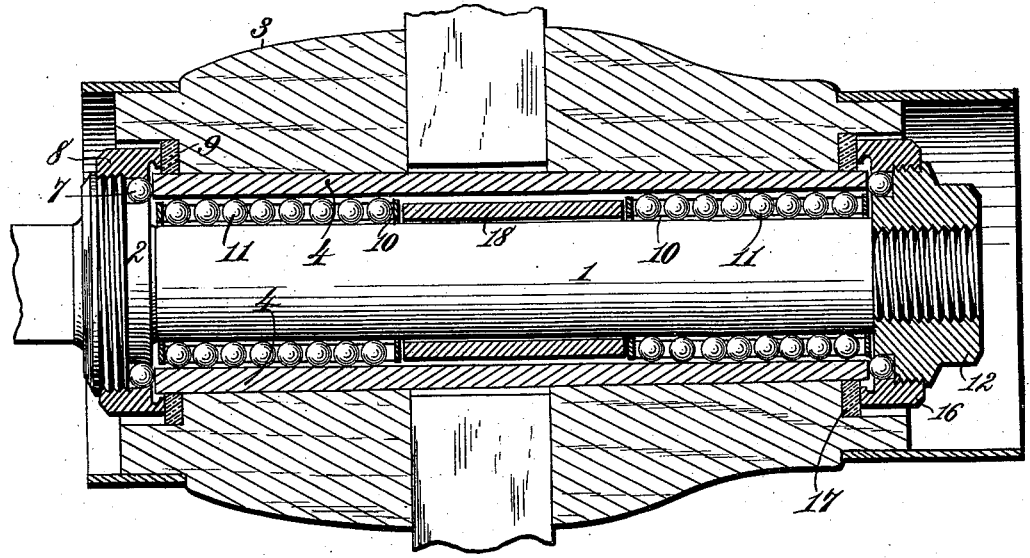

In the annexed drawings, illustrating the invention, Figure 1 is a longitudinal sectional view showing one manner of applying my improved ball-bearing to a wheel-hub. Fig. 2 is a similar view showing another mode of applying the ball-bearing.

Referring to the drawings, the numeral 1 designates an axle-spindle provided with a collar 2 at its inner end. The axle-spindle is preferably made of metal and formed or provided with a hardened surface.

The ends of the hub 3 are recessed, as shown, and in the interior of the hub is secured a hardened metallic sleeve, lining, or bushing 4, the ends of which, as shown in Fig. 2, may project somewhat into the recesses formed in the hub ends.

As shown in Fig. 1, the collar 2 of the axle-spindle may be formed with an annular recess 5 to receive an annular cage 6, in which is confined a circular series or group of spherical rollers or balls 7, that project laterally in both directions to bear against and roll upon plane surfaces for the purpose of resisting thrust or end pressure. The hardened plane surfaces against and between which the balls 7 revolve are furnished by the vertical wall of the collar 2 on one side and the end of the sleeve 4 on the other side. In the construction shown in Fig. 2 the cage 6 is omitted and the balls 7 are confined between the collar 2 and a ring 8, that is screwed onto a threaded portion of said collar. The opposite edges of the open side of the recess thus formed by the collar 2 and ring 8 are flared toward each other, as shown, so as to confine the balls 7 in such a manner that they will be capable of revolving freely in all directions and may be removed in a body with the axle-spindle. In the inner end of the hub is placed an annular packing 9, that may abut against the collar 2, as shown in Fig. 1, or the ring 8, as shown in Fig. 2, for the purpose of forming a close joint and excluding dust and moisture.

Between the hub and axle-spindle I place one or more annular cages 10, in which are confined a number of spherical rollers or balls 11, that are adapted to revolve freely in all directions in bearing contact with the hardened concentric surfaces of the hub and axle for the purpose of sustaining radial pressure and obviating the objectionable effects of friction. It will be seen that the length of the cage or cages 10 and the number of the balls 11 confined therein are such that the said balls have sufficient room for free lateral play, so as to distribute the friction and wear uniformly.

The wheel-hub is held on the axle by means of a cap or nut 12, screwed onto the threaded end of the axle-spindle. The inner face of this nut may be provided with an annular recess 13, as shown in Fig. 1, to receive a cage 14, in which are confined a number of spherical rollers or balls 15, that project laterally in both directions to bear against and roll on the hardened plane surfaces of the said cap or nut 12 and the adjacent end of the sleeve 4 in the hub for the purpose of resisting thrust or end pressure. As shown in Fig. 2, the cage 14 may be omitted and the balls confined in the recessed inner face of the nut or cap 12 by means of a ring 16, screwed onto an externally-threaded portion of said nut or cap. In the outer end of the hub is inserted an annular packing 17, against which may abut the cap or nut 12, as shown in Fig. 1, or the ring 16, as shown in Fig. 2, thereby forming a close joint and excluding dust and moisture. When the cage 14 is omitted, as shown in Fig. 2, the opposite edges of the open side of the annular recess in which the balls 15 are placed should be flared toward each other, so as to confine said balls in such a manner as to permit them to be removed in a body with the cap or nut 12 and attached ring 16, and yet permit the balls to revolve freely in all directions. If preferred, the balls 11 for sustaining radial pressure need not be arranged along the whole of the concentric bearing-surfaces. They may be placed in a cage located only at one end of the radial bearing and the remaining space between the hub and the axle spindle or shaft be occupied by a loose sleeve or collar, or there may be a cage of balls at each end of the bearing, as shown in Fig. 2, and a loose sleeve or collar 18 placed on the axle-spindle between said cages. I may also supply with balls 11 only some of several short cages 10, or one or more compartments of a long cage, and leave the other cages or cage compartments empty, as in many cases it may not be necessary to fill the space between the concentric surfaces with balls.

The ball-carrying cages 6, 10, and 14 may be of any suitable construction, as shown, for instance, in Letters Patent Nos. 449,959, 449,960, 449,963, and 449,968, granted to me April 7, 1891.

It will be seen that the separate groups of balls 7 and 15 for resisting thrust or end pressure are so arranged as to surround the shaft or axle and that they are located and confined in annular recesses at the opposite ends of the hub in position to revolve freely between and against the hardened plane bearing-surfaces and take the thrust or end pressure from both ends of the hub or other rotary part. It will also be observed that the several sets or groups of balls for resisting radial pressure or for resisting thrust are each removable in a body with their confining or retaining devices, thus adding greatly to the convenience of handling such balls in fitting the parts of a ball-bearing of this character. Each ball of the several groups is so arranged with relation to the bearing-surfaces as to bear thereon only at two diametrically-opposite points, whereby a wedging action of the balls is avoided and the friction and wear greatly diminished.

What I claim as my invention is—

In a ball-bearing, the combination, with an axle 1, having a collar 2, and a hub 3, having recessed ends, of the hardened sleeve or bushing 4, the nut 12 on the outer end of the axle-spindle, the packing-rings 9 and 17, located in the recessed ends of the hub, balls 11, adapted and arranged to revolve freely in all directions between and each bear only at two diametrically-opposite points against the hardened concentric and parallel bearing-surfaces of the axle-spindle and surrounding sleeve or bushing for the purpose of sustaining radial pressure, a removable cage 10 for retaining said balls in a body and in which they have free lateral play, and other balls 7 and 15, surrounding the axle at opposite ends of the hub and adapted and arranged to revolve freely in all directions between and each bear only at two diametrically-opposite points against the hardened parallel plane bearing-surfaces furnished by the ends of the sleeve or bushing and the adjacent collar and nut for the purpose of resisting thrust, substantially as shown and described.

In testimony whereof I have hereunto set my hand and affixed my seal in presence of two subscribing witnesses.

GEO. F. SIMONDS. [L. S.]

Witnesses:
JAMES L. NORRIS,
JAMES A. RUTHERFORD.